US008490019B2

(12) United States Patent  
Jarrett et al.

(10) Patent No.: US 8,490,019 B2
(45) Date of Patent: Jul. 16, 2013

(54) DISPLAYING THUMBNAIL COPIES OF EACH RUNNING ITEM FROM ONE OR MORE APPLICATIONS

(75) Inventors: Robert J. Jarrett, Snohomish, WA (US); Bret P. Anderson, Kirkland, WA (US); Stephan Hoefnagels, Seattle, WA (US); Chaitanya Dev Sareen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 12/021,928

(22) Filed: Jan. 29, 2008

(65) Prior Publication Data

US 2009/0193364 A1    Jul. 30, 2009

(51) Int. Cl.
*G06F 3/048*    (2006.01)
(52) U.S. Cl.
USPC ............................. 715/838; 715/835
(58) Field of Classification Search
USPC .......................... 715/838, 835, 810
See application file for complete search history.

(56) References Cited

U.S. PATENT DOCUMENTS

| | | | | | |
|---|---|---|---|---|---|
| 5,917,488 | A | * | 6/1999 | Anderson et al. | 715/838 |
| 6,008,809 | A | * | 12/1999 | Brooks | 715/792 |
| 6,026,409 | A | * | 2/2000 | Blumenthal | 1/1 |
| 6,146,027 | A | * | 11/2000 | Orton et al. | 715/835 |
| 6,166,736 | A | * | 12/2000 | Hugh | 715/798 |
| 6,166,738 | A | | 12/2000 | Robertson | |
| 6,771,292 | B2 | * | 8/2004 | Sharp | 715/788 |
| 7,203,737 | B2 | * | 4/2007 | Starbuck et al. | 709/219 |
| 7,552,397 | B2 | * | 6/2009 | Holecek et al. | 715/788 |
| 2003/0081011 | A1 | * | 5/2003 | Sheldon et al. | 345/838 |
| 2003/0090690 | A1 | * | 5/2003 | Katayama et al. | 358/1.9 |
| 2003/0117440 | A1 | * | 6/2003 | Hellyar et al. | 345/767 |
| 2004/0128317 | A1 | | 7/2004 | Sull | |
| 2004/0160640 | A1 | | 8/2004 | Corrales | |
| 2005/0091596 | A1 | * | 4/2005 | Anthony et al. | 715/712 |
| 2005/0149879 | A1 | * | 7/2005 | Jobs et al. | 715/796 |
| 2005/0240878 | A1 | * | 10/2005 | Anthony et al. | 715/765 |
| 2006/0123353 | A1 | * | 6/2006 | Matthews et al. | 715/779 |
| 2006/0161847 | A1 | * | 7/2006 | Holecek et al. | 715/716 |
| 2006/0224989 | A1 | * | 10/2006 | Pettiross et al. | 715/779 |

(Continued)

OTHER PUBLICATIONS

Reenskaug, Trygve; "Models-Views-Controllers" published Dec. 10, 1979. Reenskaug discusses the well known software design pattern, Model-View-Controller (MVC).*

(Continued)

*Primary Examiner* — Steven Sax
*Assistant Examiner* — Wilson Varga
(74) *Attorney, Agent, or Firm* — Shook, Hardy & Bacon LLP

(57) ABSTRACT

Methods, user interfaces, and computer-readable media for displaying thumbnail copies of running items for a particular running application on a display are provided. The displayed thumbnail copies are interactive, and provide the user with an easy and efficient way to identify and manage multiple items, such as windows, that are concurrently running. The thumbnail copies are either snapshots or real-time displays of the corresponding running items, depending on whether the running item is minimized or maximized at the time the thumbnail copies are displayed. The user interacts with the thumbnail copies by choosing to either close a particular running item by selecting the closing icon on the corresponding thumbnail copy, or view a particular running item on the display by selecting the corresponding thumbnail in any location other than the closing icon.

20 Claims, 8 Drawing Sheets

U.S. PATENT DOCUMENTS

| | | | |
|---|---|---|---|
| 2006/0242602 A1* | 10/2006 | Schechter et al. | 715/838 |
| 2006/0288389 A1* | 12/2006 | Deutscher et al. | 725/88 |
| 2006/0294469 A1* | 12/2006 | Sareen et al. | 715/730 |
| 2007/0061733 A1* | 3/2007 | Schechter et al. | 715/740 |
| 2007/0113196 A1* | 5/2007 | Wang | 715/781 |
| 2007/0146491 A1* | 6/2007 | Tremblay et al. | 348/211.99 |
| 2007/0245256 A1* | 10/2007 | Boss et al. | 715/768 |

OTHER PUBLICATIONS

Frakes, Dan; Macworld, dated Jun. 12, 2007 (Aug. 2007 Issue), "First Look: Leopard preview: Desktop and File changes." Discusses stacks of icons on a desktop that previews files; also discusses "better previews" or "live" thumbnails. www.macworld.com/article/58382/2007/desktopfinderfl.html.*

Pogue, David; Mac OS X: The Missing Manual, Leopard Edition, copyright Dec. 2007, ISBN-13: 978-0-596-52952-9, pp. 156-159.*

Apple—Mac OS X—Features—"Expose': Find the window you need now," printed from http://www.apple.com/macosx/features/expose/ on Mar. 18, 2005, 3 pages.*

"Windows Vista Home Premium User Interface, Annotated Excerpts," Microsoft Corp., copyright 2007; screen captured Mar. 12, 2012. 14 pgs.*

Gralla; Preston, "Windows Vista in a Nutshell," ISBN-13: 978-0-596-52707-5, O'Reilly Media, Inc., published Dec. 22, 2006. pp. 48-49, 52, 58, 84-85, 91, 121-123, 136-142.*

"Microsoft Computer Dictionary," 5th edition, ISBN 0-7356-1495-4, Microsoft Press, copyright 2002. pp. 654, 714-715.*

IEEE 100, The Authoritative Dictionary of IEEE Standard Terms, 7th edition, ISBN 0-7381-2601-2, The Institute of Electrical and Electronics Engineering, Inc., copyright 2000. p. 1281.* http://www.crystalxp.net/galerie/en.id.197.html; Visual Tooltip.

http://wiki.opencompositing.org/Plugins/Switcher: Application Switcher.

* cited by examiner

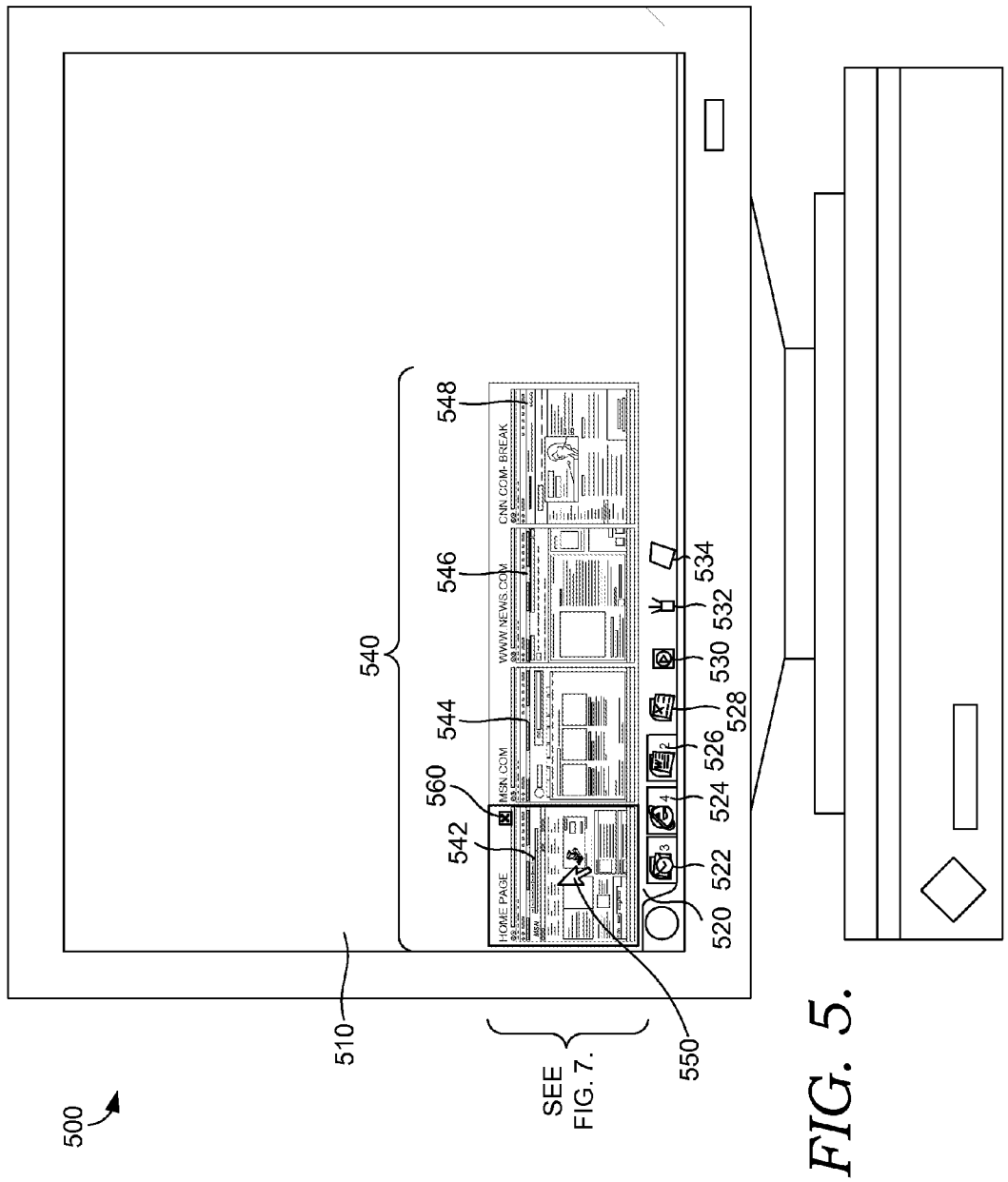

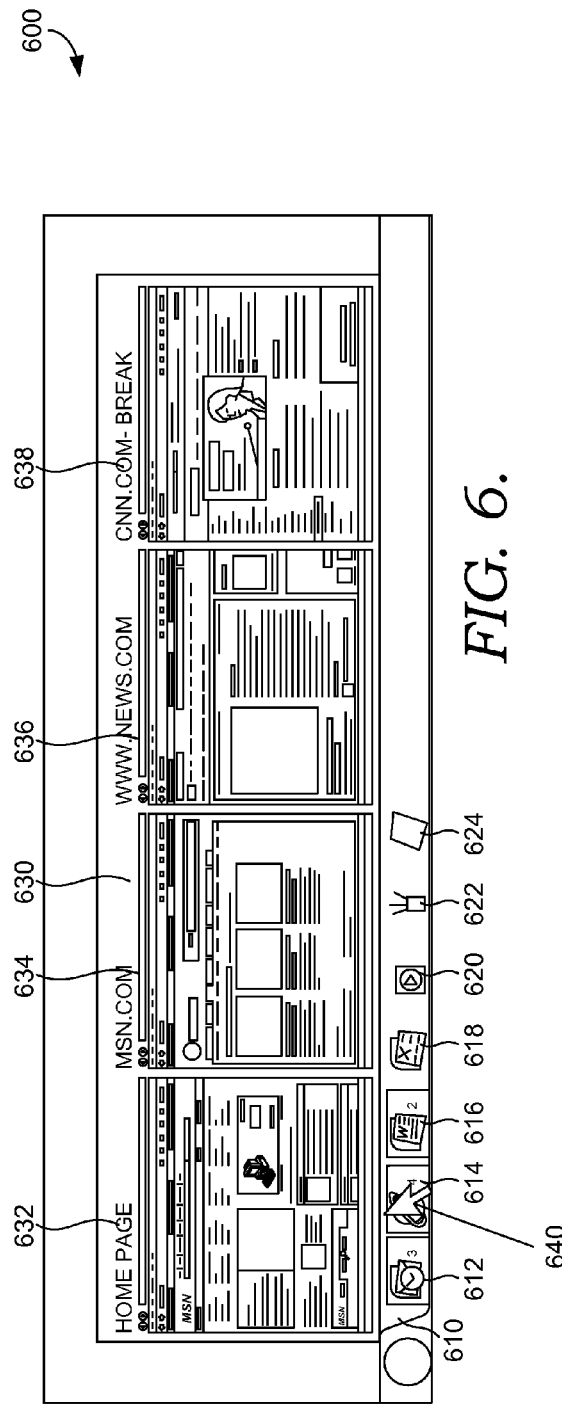
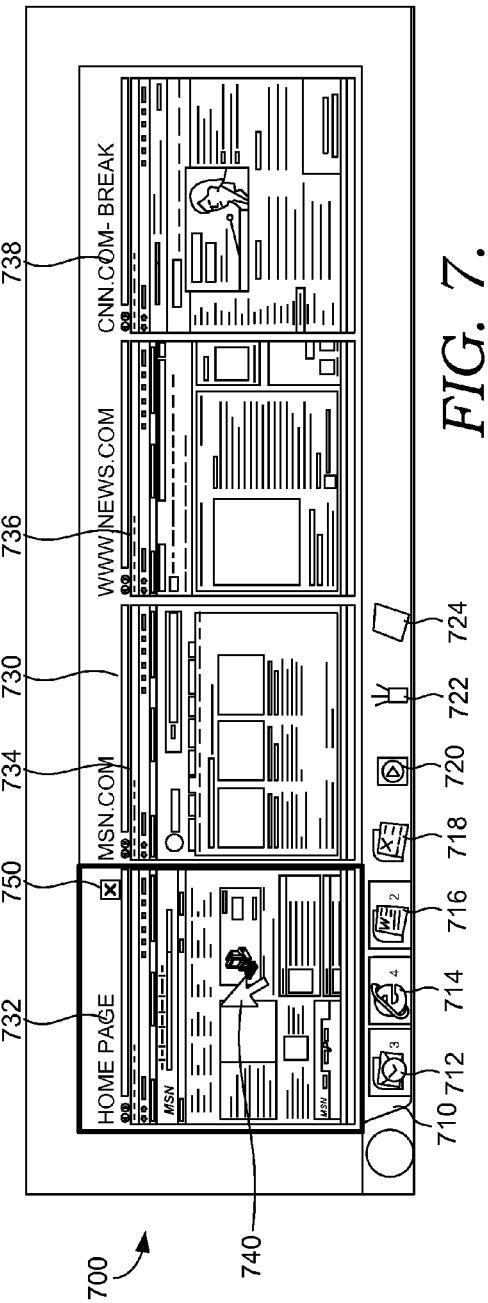

DISPLAYING THUMBNAIL COPIES OF EACH RUNNING ITEM FROM ONE OR MORE APPLICATIONS

BACKGROUND

Managing applications and corresponding running items (e.g., open windows) on a computer has become increasingly difficult and burdensome, as computers are more heavily relied upon now than in the past. Typically, users run more than one application at a time, and each application can have multiple items running concurrently. The availability of computers having increased computer speed and memory, in addition to improved overall computer performance over the last several years has provided users with the capability to efficiently run multiple applications at the same time, which was not practical in the past. Presently, although many computers are able to provide users with the capability of running multiple applications concurrently, managing these applications and associated running items is still difficult and time consuming.

Currently, users are able to manage multiple applications and associated running items by selecting (e.g., using a cursor) individual icons (e.g., tasks) located in the icon list area (e.g., taskbar) to identify and locate a particular running item. The icon list area provides the user with only a basic functionality, in that it typically displays icons that represent running items or applications having more than one corresponding running item (e.g., glomming). When a user wishes to display a certain running item, the user can select the corresponding icon in the icon list area, or use another method such as the alt-tab function. If the user is currently running multiple applications and has multiple running items open for each application, it can be a daunting and time-consuming task to identify the particular running item that a user wishes to view.

SUMMARY

Embodiments of the present invention relate to methods, user interfaces, and computer-readable media for displaying a thumbnail copy of each running item for a particular running application on a display. Each running application is represented by an icon located in the icon list area, and the user is allowed to select one of the icons (e.g., by hovering a cursor over the icon) to display a thumbnail copy of each running item for a particular application. Once the thumbnail copies are displayed, the user can select one of the thumbnail copies (e.g., by hovering a cursor over it), which causes that thumbnail copy to be highlighted. The thumbnail copies are interactive, and thus the user may choose to either close a running item or view a running item on the display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein:

FIG. 5 is an illustrative screen display, in accordance with an embodiment of the present invention, of an exemplary user interface showing a thumbnail copy of each running item for a particular running application, and a highlighted thumbnail copy and a closing icon in response to a user selection of that thumbnail copy;

FIG. 6 is an enlarged view of a portion of the illustrative screen display of FIG. 4, illustrating a thumbnail copy of each running item for a particular running application;

FIG. 7 is an enlarged view of a portion of the illustrative screen display of FIG. 5, illustrating a thumbnail copy of each running item for a particular running application, and a highlighted thumbnail copy and a closing icon in response to a user selection of that thumbnail copy.

DETAILED DESCRIPTION

Figure 1:
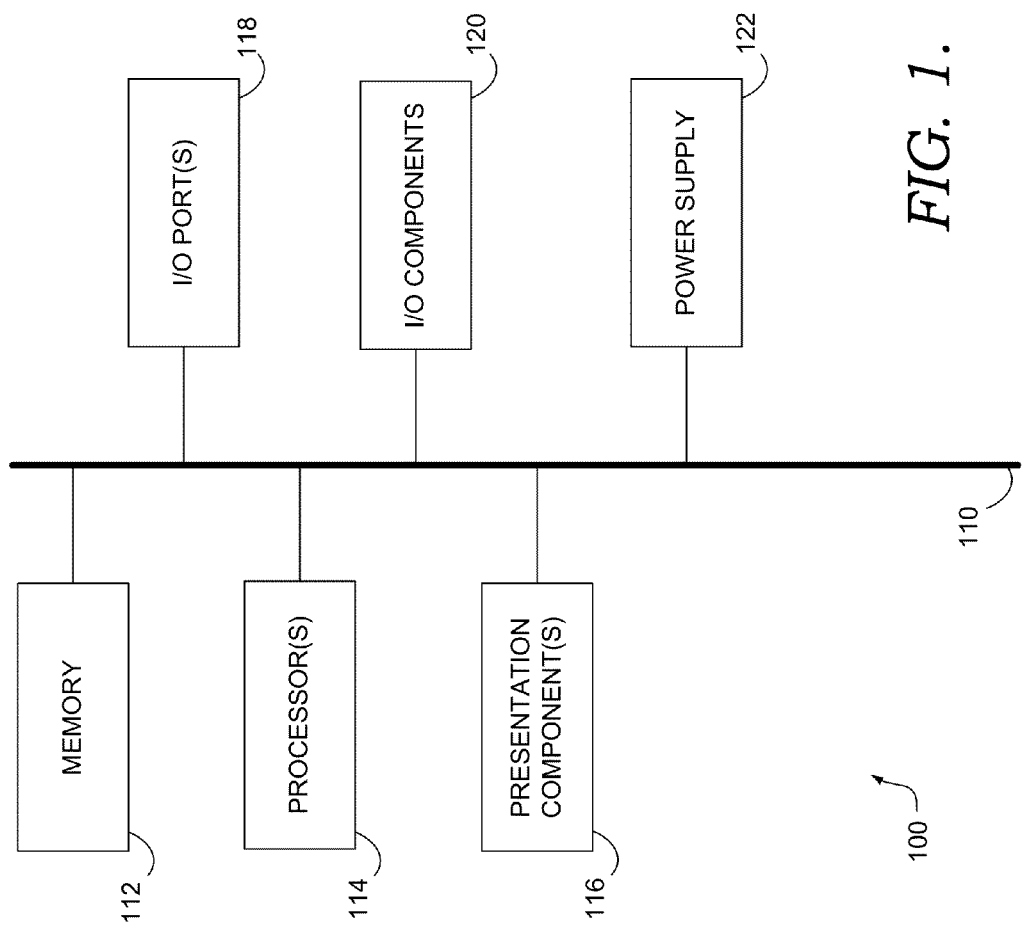
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods for displaying a thumbnail copy of each running item for a particular running application on a display. In one aspect, a computer-implemented method for displaying a thumbnail copy of each running item for a particular running application on a display is provided. Icons are presented on the display, each icon representing a particular running application. At least two running items are associated with each running application. A user selection is received for one of the displayed icons. This selection can be accomplished by any selection device, such as a mouse or similar device to hover a cursor over an icon, or the alt-tab function. Once the user selection is received, a thumbnail copy of each running item for the particular running application is presented to the user on the display, allowing the user to browse through all of the running items at the same time.

In another aspect, a user interface embodied on one or more computer-storage media, the user interface displaying a thumbnail copy of each running item for a particular running application on a display is provided. As described herein above, icons are displayed on the display and represent each running application, each running application having at least two running items associated therewith. The icons are displayed in an icon list area. Once a user selects an icon, the thumbnail copies, each representing a running item for the particular running application, are displayed in a thumbnail display area.

In yet another aspect, one or more computer-readable media having computer-executable instructions embodied thereon that, when executed, perform a method for displaying a thumbnail copy of each running item for a particular running application on a display are provided. Icons are presented on the display, each icon representing a particular running application, and at least two running items are associated with each running application. A user can select one of the icons, such as by hovering a cursor over it, and as a result, a thumbnail copy of each running item for the particular running application is presented to the user on the display, allowing the user to browse through all of the running items at one time. The thumbnails are interactive, so that the user can select one of the thumbnail copies, which highlights the selected thumbnail copy and causes the display of a closing icon on the selected thumbnail copy. The user has the option of either closing the corresponding running item, or viewing the corresponding running item on the display. To close the corresponding running item, the user can select the closing icon (e.g., by using a mouse and cursor to click on the closing icon). To view the corresponding running item, the user can select, in a similar manner, any location on the thumbnail copy other than the closing icon.

Having briefly described an overview of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-usable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computer 110 typically includes a variety of computer-readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
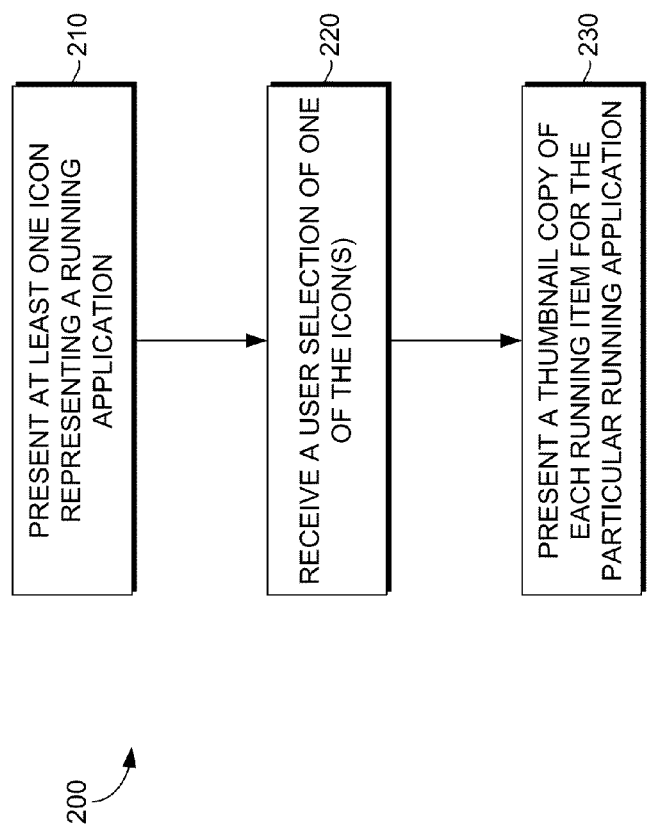
FIG. 2 is a flow diagram of a method for displaying a thumbnail copy of each running item for a particular running application on a display, in accordance with an embodiment of the present invention.

Turning now to FIG. 2, a flow diagram is illustrated which shows a method 200 for displaying a thumbnail copy of each running item for a particular application on a display, in accordance with an embodiment of the present invention. In one embodiment, the thumbnail copies are displayed on the bottom portion of the display directly above the icons, in the taskbar or toolbar. Initially, as indicated at block 210, at least one icon is presented, each icon representing a running application. An icon is an interactive button, such as a task or tool, typically located in the taskbar or toolbar, which represents an application or item associated with an application. An application is a program that gives computer instructions that provide the user with tools to accomplish a task, and includes programs such as Microsoft Word, Microsoft Excel, Internet Explorer, and Microsoft Outlook. A user may select one of the presented icons. The user's selection is received at block 220. It will be appreciated that a user selection can occur in any variety of ways, including but not limited to hovering a cursor over the icon, clicking on the icon, or using the alt-tab function. In response to the user selection of an icon, a thumbnail copy of each running item for the particular application is presented at block 230. A running item is an open instance of a particular running application. Thus, any running application items currently visible on the user's display are still visible when the thumbnail copies are presented. While being depicted as being displayed on the bottom of the screen, it will be appreciated that the thumbnail copies may be displayed anywhere on the screen.

Figure 3:
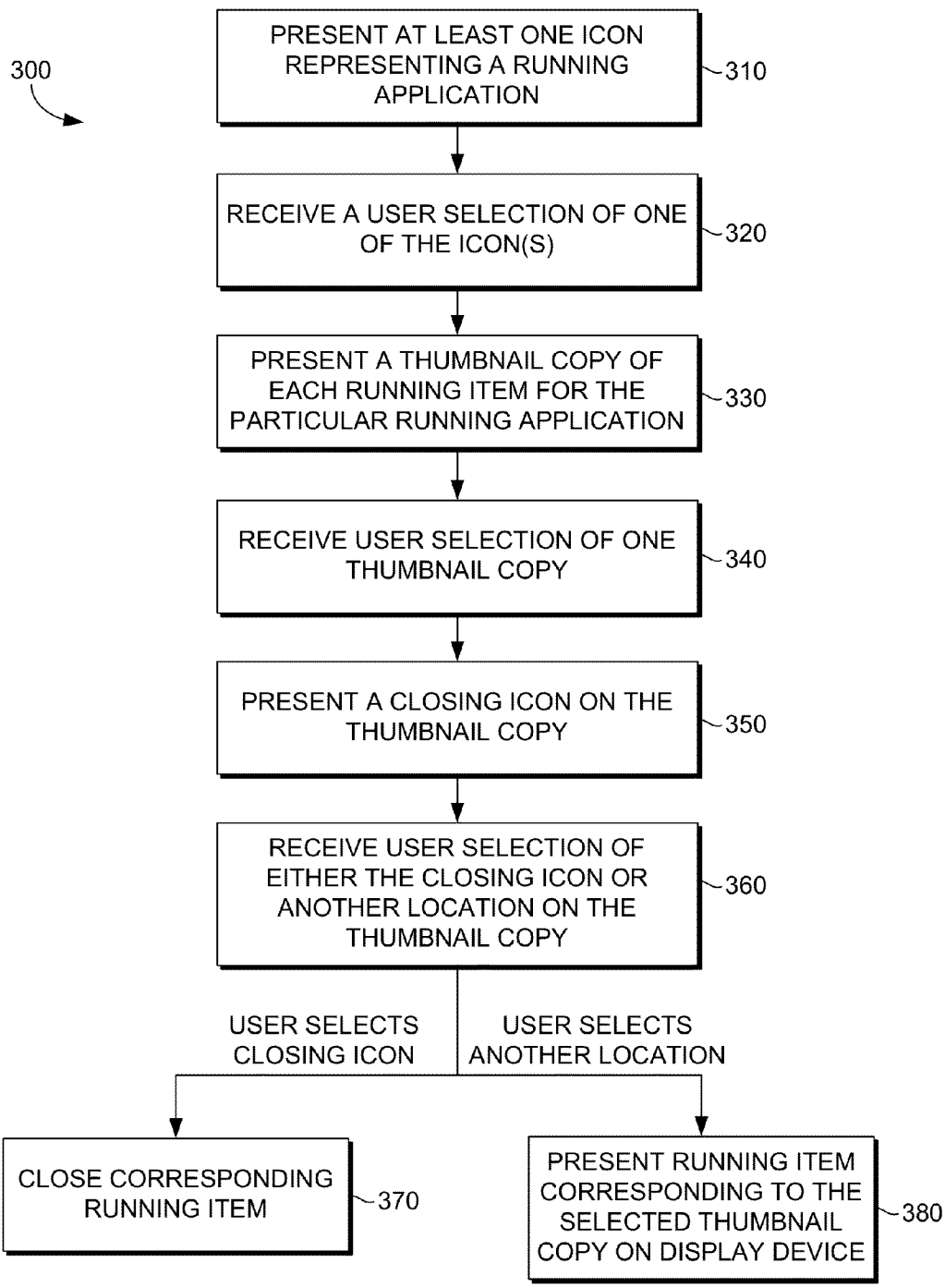
FIG. 3 is a flow diagram of a method for displaying a thumbnail copy of each running item for a particular running application on a display, in accordance with another embodiment of the present invention.

With reference to FIG. 3, a flow diagram is illustrated showing a method 300 for displaying a thumbnail copy of each running item for a particular running application on a display, in accordance with another embodiment of the present invention. Initially, as indicated at block 310, at least one icon is presented. Each icon represents a running application. A user may select one of the presented icons at block 320. Again, user selection may be accomplished in a variety of ways. In response to the user selection of an icon, a thumbnail copy of each running item for the particular application is presented at block 330. At block 340, the user selection of at least one of the thumbnail copies is received. In one embodiment, user selection, such as hovering a cursor over the thumbnail highlights the thumbnail. Further, highlighting a thumbnail allows the user to recognize it as being the selected thumbnail, as the thumbnail stands out and is prominent and emphasized to the user. Highlighting may be accomplished by a color change of the thumbnail, or by making the thumbnail appear either brighter or darker than the other thumbnails. It will be appreciated that the thumbnail can be highlighted in any way, as long as it is displayed differently than the other thumbnails so that the user is able to differentiate it from the other non-selected thumbnails. In addition to the selected thumbnail copy being highlighted, a closing icon may be presented on the selected thumbnail copy at block 350. The thumbnail copies are interactive, and therefore allow the user to either select the closing icon to close the corresponding running application, or select any other area on the highlighted thumbnail copy at block 360. At block 370, the corresponding running item closes, or stops running, when the user selects the closing icon. In one embodiment, user selection of any other area, other than the closing icon, on the highlighted thumbnail copy results in the corresponding running item being displayed on the display at block 380. The corresponding running item display is larger than the thumbnail copy. In one embodiment, the running item is displayed on the full screen.

In one embodiment, the user can use a mouse or a similar device to hover the cursor over one of the thumbnail copies, wherein the thumbnail copy is then highlighted and a closing icon is displayed on the highlighted thumbnail copy. The user may have several running items open for a particular running application, and may wish to clean up and manage the running items by closing one of them. Instead of maximizing one running item at a time to identify the running item the user wishes to close, the user may use the method described above and easily locate and close the running item from the thumbnail copy that the user no longer wants to be running without having to display the full running application or running item.

Figure 4:
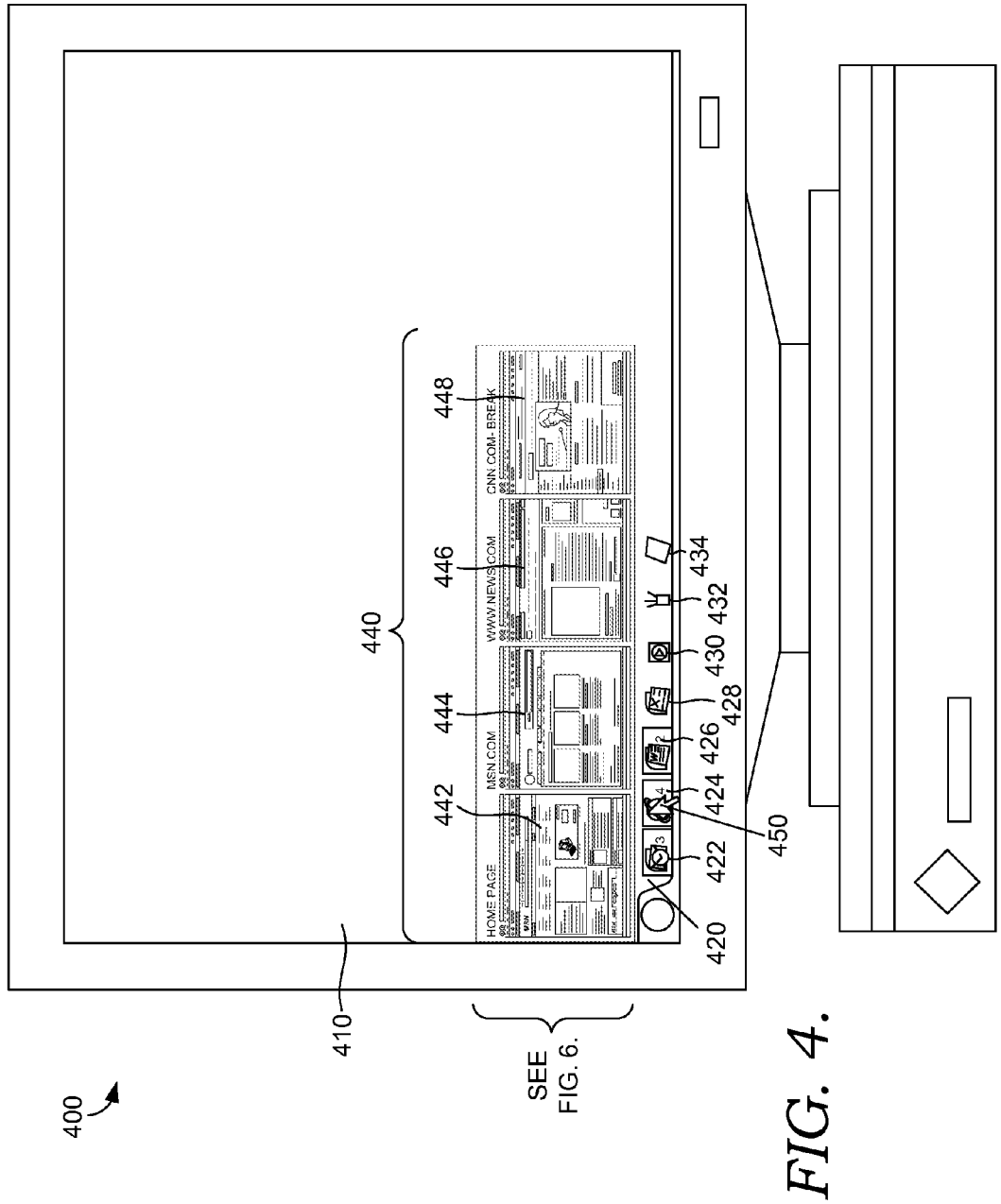
FIG. 4 is an illustrative screen display, in accordance with an embodiment of the present invention, of an exemplary user interface showing a thumbnail copy of each running item for a particular running application.

Referring now to FIG. 4, an illustrative screen display is shown, in accordance with an embodiment of the present invention, of an exemplary user interface 400 showing a thumbnail copy of each running item for a particular running application in response to a user selection of the icon representing that particular running application. Generally, the exemplary user interface 400 comprises a display 410, an icon list area 420, and a thumbnail display area 440. The icon list area 420 and the thumbnail display area 440 can be displayed anywhere on the display 410, but are shown in FIG. 4 near the bottom of the display 410.

More particularly, the icon list area 420 is comprised of at least one icon, each icon representing a running application. As shown in the exemplary user interface 400, in one embodiment there is one icon in the icon list area 420 for each running application. This minimizes the number of icons that are displayed. Running applications, such as 422, 424 and 426, are highlighted (e.g. boxed, color change, etc.) to identify the running applications. Icons 428, 430, 432, and 434 are not running applications but are applications that are installed on the computing device, and thus are not highlighted.

The icons in the icon list area 420 may be displayed in any order. In one embodiment, the icons are displayed in order of opening (e.g. first opened application on the left, last opened application on the right). This ordering may assist the user in quickly locating a particular running application. It will be appreciated that the icons may be listed in any order.

A cursor 450 is shown in FIG. 4 as hovering over icon 424, which, in response, causes a display of the thumbnail display area 440. Using a cursor to hover over an icon is one example of how a user can select an icon. There are many other methods, including the alt-tab function, that can be used, all of which are included as a means to select an icon in the present invention. The thumbnail display area 440 is shown with four thumbnail copies, items 442, 444, 446, and 448, each thumbnail copy representing a corresponding running item of a particular running application. The thumbnail copies for the same running application are displayed simultaneously.

Each thumbnail copy is either a snapshot or a real-time display of the corresponding running item. The thumbnail copy may be a static snapshot or picture of the corresponding running item. This may occur in some instances where the corresponding running item is minimized on the display. For instance, this may occur if the running item is hidden, or cannot be seen on the display. The thumbnail copy may be a real-time display, or duplicative view, of the corresponding running item. This may occur in instances where the running item is maximized on the display (e.g., exposed, or can be seen on the display). Some applications require high performance graphic output to render video frames or animation, such as certain media players and games. In these cases, it is possible for the thumbnail copy to be a live rendering of the corresponding running item whether the running item is minimized or maximized.

While depicted as having four thumbnail copies shown in the thumbnail display area 440, it will be appreciated that any number may be presented. The number of thumbnails may be restrained by the number of thumbnail copies that can fit across the display at one time. Each thumbnail copy can be presented in any size, but typically smaller than a full-size application. The size of the thumbnails can be changed depending on the number of running items there are for a particular application, and therefore the number of corresponding thumbnail copies. Furthermore, the thumbnails may be of differing sizes. For exemplary purposes only, a thumbnail copy may be 200×200 pixels. If the quantity of thumbnail copies in the thumbnail display area 440 reaches a pre-determined threshold, or when more room is required for the display of additional thumbnail copies, each thumbnail copy may decrease in size (e.g., 100×100 pixels) to accommodate the increased number of thumbnail copies in the thumbnail display area 440. These sizes, of course, can be altered, and there may be a set threshold for the number of thumbnail copies that can be displayed at one time.

In one embodiment, when the upper threshold (e.g., exceeds sixteen thumbnail copies) in the thumbnail display area 440 is reached, thumbnail copies for all items will not appear in the thumbnail display area 440. In this embodiment, the running items may be displayed in list form to accommodate the large quantity of running items. In another embodiment, the thumbnail copies will be displayed in the thumbnail display area 440, but a scrolling device will appear on the display to allow the user access to all thumbnail copies, even though all are not able to be displayed in the thumbnail display area 440 at the same time. Still, in another embodiment, only certain thumbnail copies are displayed in the thumbnail display area 440 when the threshold is exceeded. A variety of criteria may be used to determine which thumbnail copies are displayed, such as, but not limited to, the corresponding running items that were opened during a first period of time, those that were opened during a last period of time, or those that meet other pre-determined criteria.

Referring to FIG. 5, an illustrative screen display is shown, in accordance with an embodiment of the present invention, of an exemplary user interface 500 showing a thumbnail copy of each running item for a particular running application, and a highlighted thumbnail copy and a closing icon in response to a user selection of that thumbnail copy. Generally, the exemplary user interface 500 comprises a display area 510, an icon list area 520, and a thumbnail display area 540. The icon list area 520 and the thumbnail display area 540 can be displayed anywhere on the display 510, but are shown in FIG. 5 on the bottom of the display 510. Exemplary icons 522, 524, and 526 correspond to running applications and icons 528, 530, 532, and 534 correspond to applications that are not running.

Thumbnail copies 542, 544, 546, and 548 are shown in the thumbnail display area 540. As discussed above herein, FIG. 4 displays a cursor 450 hovering over icon 424, enabling the display of the thumbnail copies 542, 544, 546, and 548. Once the thumbnail copies are displayed, the user may select one of the displayed thumbnail copies. The method of selection for the thumbnail copies, like the method of selection for the icons discussed above, is not limited to any certain method. For exemplary purposes only, the user can hover a cursor 550 over any one of the displayed thumbnail copies. By hovering a cursor 550 over a displayed thumbnail copy in the thumbnail display area 540, the selected thumbnail copy is highlighted, as shown with thumbnail copy 542.

In one embodiment, the highlighted thumbnail copy may display a closing icon 560, which allows for interaction with the thumbnail copy. The interaction may include, but is not limited to, the user being able to close the selected thumbnail copy 542 by selecting the closing icon 560. In one embodiment, the closing icon 560 is located in the upper right hand corner of the highlighted thumbnail copy 542. In one embodiment, the user may select closing icon 560 by clicking on it. The corresponding running item is then closed. Alternatively, the user may select any area other than the closing icon on the selected thumbnail copy 542. In one embodiment, the user may select this area by clicking on it. This causes the corresponding running item to be displayed on the display 510, and in most embodiments, larger than the thumbnail copy of the running item.

Turning now to FIG. 6, an enlarged view of a portion of the illustrative screen display of FIG. 4 is shown. User interface 600 illustrates a thumbnail copy of each running item for a particular running application in response to a user selection of the icon representing that particular running application. As described with respect to FIG. 4, the icon list area 610 contains several icons, including 612, 614, 616, 618, 620, 622, and 624. The thumbnail display area 630 has four thumbnail copies, 632, 634, 636, and 638, each corresponding to a running item. In this instance, each running item is from a corresponding Internet Explorer application. A cursor, 640, is shown hovering over icon 614, which causes the thumbnail display area 630 to appear on the display. It will be appreciated that any selection method can be used.

Referring to FIG. 7, an enlarged view of a portion of the illustrative screen display of FIG. 5 is shown. User interface 700 illustrates a thumbnail copy of each running item for a particular running application, and a highlighted thumbnail copy and a closing icon in response to a user selection of that thumbnail copy. As described with respect to FIG. 5, the icon list area 710 contains several icons, including 712, 714, 716, 718, 720, 722, and 724. The thumbnail display area 730 has four thumbnail copies, 732, 734, 736, and 738, each corresponding to a running item. When a thumbnail copy 732 has been selected, (e.g., highlighted), a closing icon 750 appears. In one embodiment, a cursor 740 may be used to select a thumbnail copy. This allows the thumbnail copy to be interactive, permitting the user to either close the corresponding running item by selecting the closing icon 750, or view the corresponding running item on the display by selecting any location on the highlighted thumbnail copy 732 other than the closing icon 750.

Figure 8:
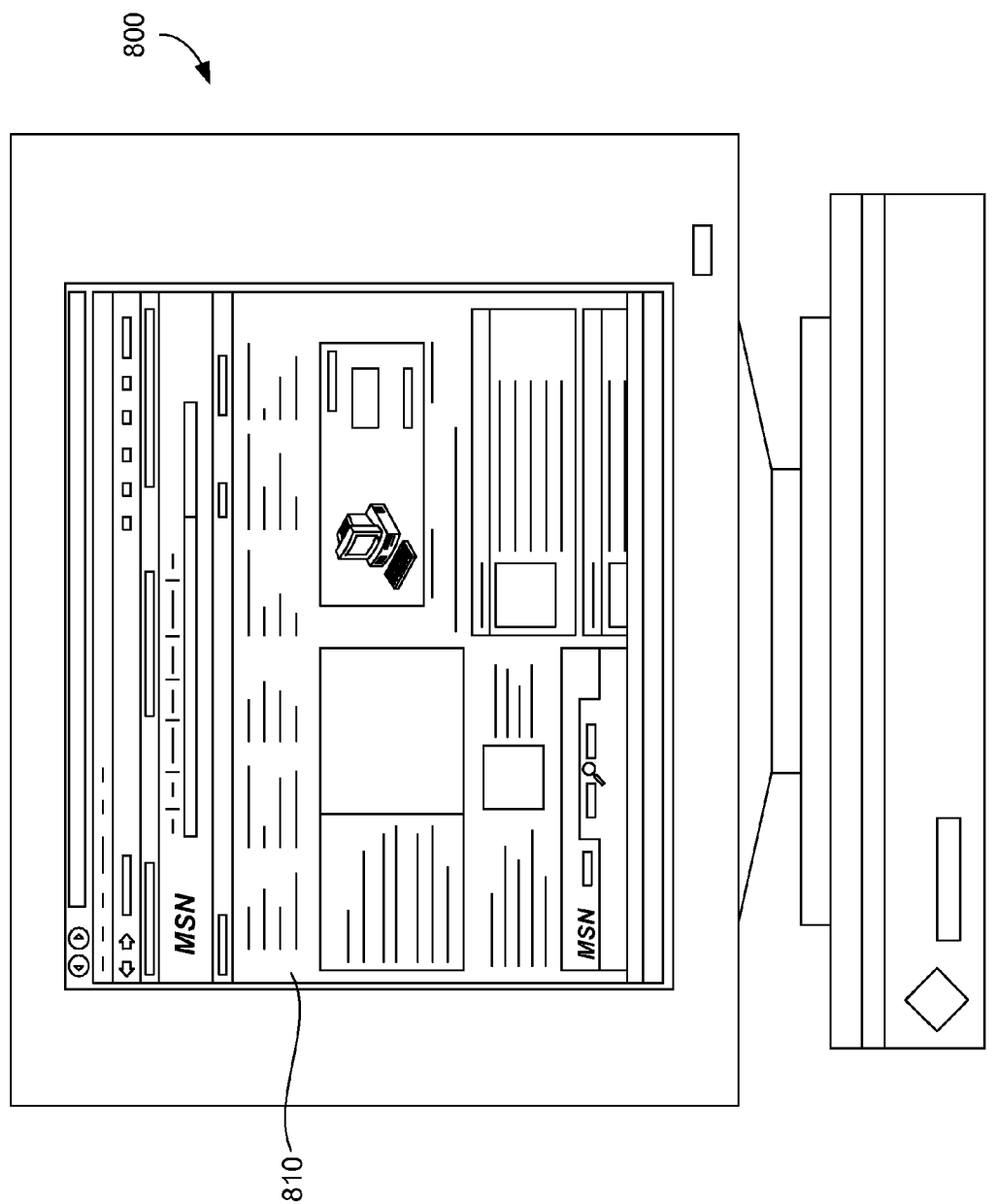
FIG. 8 is an illustrative screen display, in accordance with an embodiment of the present invention, of an exemplary user interface showing a running item corresponding to a selected thumbnail copy.

FIG. 8 is an illustrative screen display, in accordance with an embodiment of the present invention, of an exemplary user interface 800 showing the running item on the display, corresponding to a selected thumbnail copy. As described above in respect to FIG. 5 and FIG. 7, the user may select any location of the highlighted thumbnail copy 542 to make the corresponding running item visible on the display 510. Here, the user has selected the highlighted thumbnail copy, and the corresponding running item is now visible on the display 810. If the running item was previously minimized, selecting the highlighted thumbnail copy has now caused the running item to be maximized.

Figure 9:
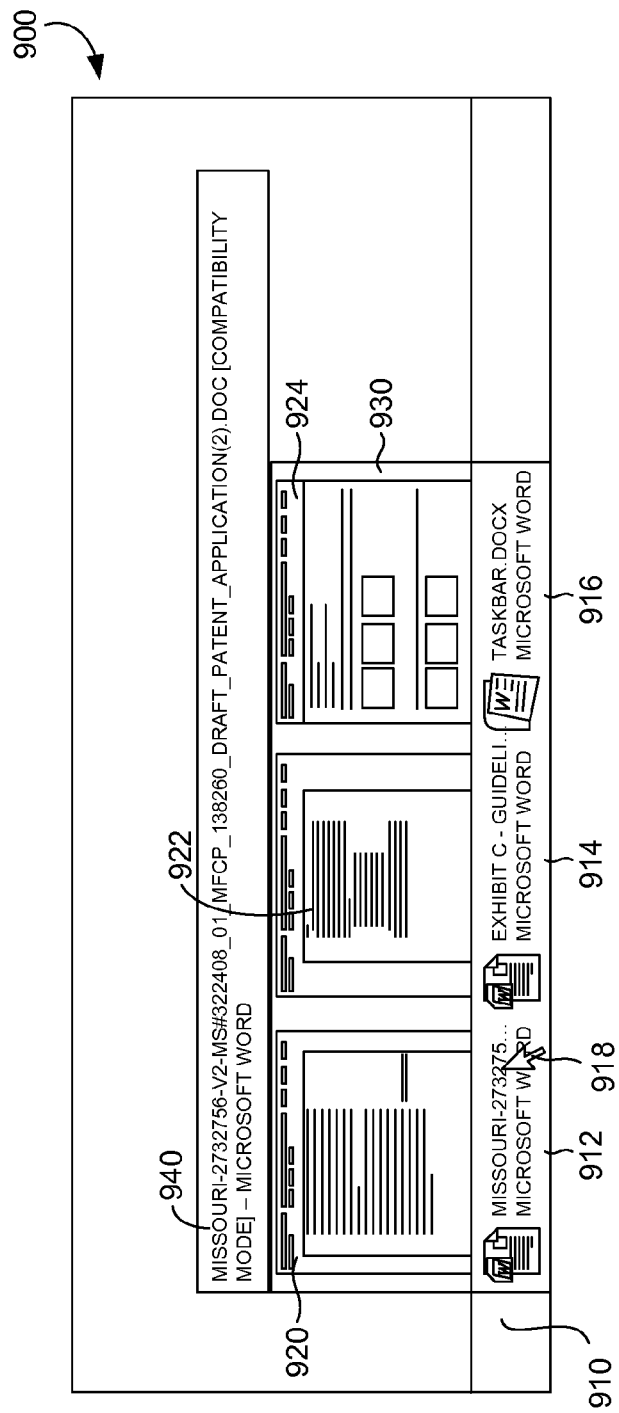
FIG. 9 is an illustrative screen display, in accordance with an embodiment of the present invention, of an exemplary user interface showing a thumbnail copy of each running item for a particular running application in response to a user selection of an icon representing a particular running item.

Referring now to FIG. 9, an illustrative screen display is shown, in accordance with an embodiment of the present invention, of an exemplary user interface 900 with a thumbnail copy of each running item for a particular running application in response to a user selection of an icon representing a particular running item. Generally, the exemplary user interface 900 comprises an icon list area 910 and a thumbnail display area 930. In this embodiment, the icon list area 910 is comprised of at least one icon (e.g., 912, 914, and 916), each icon representing a running item. If there is more than one running item for a particular running application, each running item for that running application will be represented by an icon in the icon list area 910, as shown in FIG. 9.

A cursor 918 is shown in FIG. 9 as selecting icon 912, which, in response, causes a display of the thumbnail display area 930. In this embodiment, every running item for the corresponding running application is represented by a thumbnail copy in the thumbnail display area 930 when an icon is selected by the user. For example, as shown in FIG. 9, there are three running items of the corresponding running application, Microsoft Word, each running item represented by an icon (e.g., 912, 914, and 916) in the icon list area 910. When a user selects any one of the icons 912, 914, or 916, a thumbnail copy (e.g., 920, 922, 924) for each running item is displayed in the thumbnail display area 930. In one embodiment, a running item title bar 940 is also displayed that contains the name of the running item, 912, that was selected in the icon list area 910.

Similar to the discussion regarding FIG. 4, a user may select an icon, such as 912, using a variety of methods, including hovering over the icon or using the alt-tab function. In addition, in the embodiment of FIG. 9, once the thumbnail display area 930 is displayed, the user may select one of the displayed thumbnail copies (e.g. by hovering over the thumbnail copy or using alt-tab function), which, in one embodiment, highlights the selected thumbnail copy. The user may choose to either select (e.g., by clicking on it) the closing icon on the highlighted thumbnail copy to close the corresponding running item, or select (e.g., by clicking on it) any other area of the highlighted thumbnail copy, which causes the corresponding running item to be displayed on the display device, and in most embodiments, the display is larger than the thumbnail copy of the running item.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the methods. It will be understood that certain features and sub-combinations are of utility and may be employed without reference to other features and sub-combinations. This is contemplated by and is within the scope of the claims.

What is claimed is:

1. A computer-implemented method for displaying a thumbnail copy of each running item for a particular running application on a display, the method comprising:
   presenting at least one icon representing a running application, wherein there are at least two running items associated with the running application;
   receiving a user selection of one of the at least one icon; and
   in response to the user selection, simultaneously presenting a thumbnail copy of each running item for the particular running application such that a quantity of running items associated with the running application is equivalent to the quantity of the presented thumbnail copies and such that the thumbnail copies of each running item simultaneously display specific content of the respective running item, wherein the thumbnail copy displays a state of a corresponding running item, and wherein only the thumbnail copies of each running item for the particular running application associated with the selected at least one icon are simultaneously presented;
   receiving the user selection of one of the thumbnail copies of each running item; and
   in response to receiving the user selection of the one of the thumbnail copies, present a closing icon only on the selected thumbnail copy.

2. The computer-implemented method of claim 1, wherein the thumbnail copy of each running item for the particular running application is located on a bottom portion of the display.

3. The computer-implemented method of claim 1, further comprising:
   receiving user selection of the closing icon on the corresponding thumbnail copy to close one of the running items.

4. The computer-implemented method of claim 3, further comprising:
   closing the running item in response to user selection of the closing icon on the corresponding thumbnail copy.

5. The computer-implemented method of claim 1, further comprising:
   receiving a user selection of one of the thumbnail copies.

6. The computer-implemented method of claim 5, wherein in response to receiving the user selection of one of the thumbnail copies, presenting the running item corresponding to the selected thumbnail copy.

7. The computer-implemented method of claim 1, further comprising:
   presenting a thumbnail copy as a snapshot of the corresponding running item if the corresponding running item is minimized.

8. The computer-implemented method of claim 1, further comprising:
   presenting a thumbnail copy as a real-time display of the corresponding running item if the corresponding running item is maximized.

9. The computer-implemented method of claim 1, wherein presenting the thumbnail copy of each running item for the particular running application comprises presenting the thumbnail copies in order from the corresponding running item open at an earliest time, to the corresponding running item open at a latest time.

10. The computer-implemented method of claim 1, wherein presenting the thumbnail copy of each running item for the particular running application comprises scaling the size of each thumbnail copy based on the quantity of running items associated with the particular running application.

11. The computer-implemented method of claim 1, wherein presenting the thumbnail copy of each running item for the particular running application comprises presenting only a sub-group of the thumbnail copies.

12. The computer-implemented method of claim 1, wherein the user selection includes a hover associated with the one of the at least one icon.

13. A computer-storage device having embodied thereon a user interface, the user interface for displaying a thumbnail copy of each running item for a particular running application on a display, the user interface comprising:
   an icon list area that displays at least one icon representing a running application, the running application having at least two running items associated therewith; and
   a thumbnail display area that simultaneously displays, in response to a user selection of one of the at least one icon, thumbnail copies of each running item for the running application such that each of the thumbnail copies simultaneously displays specific content of a respective running application, and such that a quantity of running items associated with the running application is equivalent to the quantity of the thumbnail copies displayed in the thumbnail display area,
   (1) wherein each of the thumbnail copies includes a state of a corresponding running item, (2) wherein only the thumbnail copies of each running item for the running application associated with the selected at least one icon are simultaneously presented, and (3) wherein upon receiving a user selection of one of the thumbnail copies of each running item, a closing icon is presented only on the selected thumbnail copy.

14. The user interface of claim 13, wherein the icon list area displays one icon for each running application.

15. The user interface of claim 13, wherein the icon list area is a toolbar.

16. The user interface of claim 14, wherein one of the icons representing a running application in the icon list area is highlighted in response to a user selection of that particular icon.

17. The user interface of claim 13, wherein one of the thumbnail copies in the thumbnail display area is highlighted in response to user selection of that particular thumbnail copy, wherein the highlighting includes a color change or a box surrounding the thumbnail copy to bring attention to the thumbnail copy.

18. The user interface of claim 17, wherein the thumbnail copy that is highlighted displays a closing icon in response to user selection of that particular thumbnail copy.

19. A computer-storage device having stored computer-executable instructions embodied thereon that, when executed, perform a method for displaying a thumbnail copy of each running item for a particular running application on a display, the method comprising:

presenting at least one icon representing a running application, wherein there are at least two running items associated with the running application;

receiving a user selection of one of the at least one icon;

in response to the user selection, simultaneously presenting a thumbnail copy of each running item for the particular running application such that a quantity of the running items associated with the running application is equivalent to a quantity of the presented thumbnail copies, the thumbnail copies of each running item simultaneously displaying specific content of the respective running item, wherein the thumbnail copy displays a state of a corresponding running item, and wherein only the thumbnail copies of each running item for the particular running application associated with the selected at least one icon are simultaneously presented;

receiving a user selection of one of the thumbnail copies of the running items;

upon receiving the user selection of the one of the thumbnail copies of the running items, presenting a closing icon only on the selected thumbnail copy;

receiving a user selection of the closing icon on the selected thumbnail copy; and in response to the user selection of the closing icon on the selected thumbnail copy, closing the corresponding running item.

20. The computer-storage device of claim 19, wherein the user selection includes a hover associated with the one of the at least one icon.

* * * * *